United States Patent [19]

Henning et al.

[11] Patent Number: 4,956,549
[45] Date of Patent: Sep. 11, 1990

[54] OPTICAL SENSING SYSTEMS

[75] Inventors: Michael L. Henning, Somerset; Christopher Lamb, Dorset, both of England

[73] Assignee: Plessey Overseas Limited, Ilford, England

[21] Appl. No.: 218,168

[22] Filed: Jul. 13, 1988

[30] Foreign Application Priority Data

Jul. 16, 1987 [GB] United Kingdom ............... 8716776

[51] Int. Cl.⁵ .............................................. H01J 5/16
[52] U.S. Cl. ........................... 250/227.14; 350/96.16; 372/18; 372/6
[58] Field of Search ............... 372/50, 18, 6; 250/227; 350/96.16

[56] References Cited

U.S. PATENT DOCUMENTS

| | | | |
|---|---|---|---|
| 4,358,851 | 11/1982 | Scifres et al. | 372/6 |
| 4,603,421 | 7/1986 | Scifres et al. | 372/50 |
| 4,616,898 | 10/1986 | Hicks, Jr. | 350/96.16 |
| 4,635,246 | 1/1987 | Taylor et al. | 372/18 |

FOREIGN PATENT DOCUMENTS

| | | |
|---|---|---|
| 0183502 | 6/1986 | European Pat. Off. |
| 2126820 | 3/1984 | United Kingdom |
| 2167574 | 5/1986 | United Kingdom |

Primary Examiner—Léon Scott, Jr.
Attorney, Agent, or Firm—Fleit, Jacobson, Cohn, Price, Holman & Stern

[57] ABSTRACT

An optical sensing system comprising single light source and a series of phase shifting switching devices positioned linearly aligned with the light source. Each phase shifting device is driven by a driving device with pulses at different frequencies and sequentially from the most proximately located phase switching device to the most distant phase switching device so that light eventually passes through each of the phase switching devices. Fiber sensor arrays are aligned with each of the phase switching devices and light reflected from the fiber sensor arrays is detected by a plurality of photodetector devices each associated with a fiber sensor array.

9 Claims, 3 Drawing Sheets

OPTICAL SENSING SYSTEMS

This invention relates to optical sensing systems and relates especially, but not exclusively, to such systems for use in hydrophones for detecting the impingement of acoustic waves on optical sensor arrays.

In our British Patent No. 2126820B there is described an optical sensing system in which electrical pulses of the same frequency or slightly different frequencies are launched into an optical fibre sensor array having distributed therealong a plurality of partially-reflective discontinuities whereby a small proportion of each of the light pulses propagating along the sensor array will be reflected back along the optical fibre sensor array by the discontinuities and is caused to interfere with other reflected signals or with reference light signals on photo-detector means for detecting changes in length of the optical fibre elements and thus the acoustic waves impinging on such elements. The optical sensing system may be a heterodyne system in which pairs of time-displaced pulses of the same duration but of slightly different frequencies F and F+ΔF are transmitted down the sensor fibre in which case signals reflected back along the sensor fibre from a discontinuity other than the first discontinuity interfere with signals reflected back from the preceding discontinuity. Alternatively, a single pulse light signal of frequency F and be transmitted down the optical fibre sensor for reflection by the discontinuities whilst a continuous light signal of frequency F+ΔF is used as a reference signal at the photo-detector means to interfere with the reflected signals of frequency F.

In our published European Patent Application No. 0183502, to which attention is hereby directed, there is described a pulse generating arrangement for producing time-displaced coherent pulses of two slightly different frequencies from a continuous wave light source. These pulses may be launched into an optical fibre sensor array having discontinuities as described above so that a proportion of the light pulses is reflected back from the discontinuities and is heterodyned with other reflected signals or with reference signals as previously described on photo-detector means in order to produce beat or modulated signals. The phase modulation of the signals will vary in dependence upon variations in length of the optical fibre elements between discontinuities due to the impingment of acoustic waves on the optical fibre sensor.

The coherent pulses of slightly different frequencies may be generated by a Bragg cell arranged to be driven alternately by signals of the two frequencies concerned so that the cell switches to produce time-displaced output pulses from a continuous wave light input to the cell. The emergent angles of the output pulses is sufficiently close to enable both pulses to be launched into the same optical fibre. With the cell in its unswitched condition before, after or between pulses the continues wave light input passes directly through the cell without deflection. The light reflected back along the optical fibre sensor array from the discontinuities therealong also passes back through the Bragg cell without deflection and may be arranged to fall on to a mirror which directs the reflected light on to photo-detector means which heterodynes the reflected signals. It will be appreciated therefore that the Bragg cell serves both as a frequency shifting and switching device.

Other frequency shifting devices could be used instead of the Bragg cell in optical sensing systems of the form described. For example, our British Patent No. 2167574B describes a frequency shifting device or modulator comprising a piezo-electric transducer (e.g. PZT cylinder) which produces mechanical stressing of an optical fibre wound around the cylinder in response to an electrical sawtooth waveform signal applied to the transducer so that the light signals propagating along the optical fibre are frequency shifted or modulated.

The present invention is directed to a reflectometric optical sensing system which is of the general form described in out British Patent No. 2126820B and co-pending published European Patent Application No. 0183502 but which enables a multiplicity of optical sensor arrays comprising optical fibres having partially-reflective discontinuities therealong to be supplied from a common light source with pulses of different frequencies which will be partialy reflected at each of the discontinuities and heterodyned with other reference signals or with reflected signals at photo-detector means.

According to one aspect of the present invention continuous wave light produced by a single light source is arranged to be applied to the first of a series of Bragg cells or equivalent phase shifting and switching devices each of which has individually associated with it means for driving the cell or the equivalent with pulses at different frequencies whereby each cell or the equivalent device produces pulses of different frequencies in different deflected directions whereby the cells are operated in time sequence so that the light from the continuous wave light source passes straight through the first Bragg cell, or the equivalent, to the second Bragg cell when the fist cell has produced its light pulse output and is no longer being driven whereupon the second Bragg cell can then be driven to generate output pulses after which the second cell ceases to be driven and allows the light from the continuous wave light source to pass throuugh both the first and second cells to the third Bragg cell and so on until the last Bragg cell has produced output pulses whereupon the first Bragg cell will be re-operated for the generation of pulses.

The Bragg cells may each produce pairs of pulses of slightly different frequency at different time intervals and these pairs of pulses which are of very close frequency may be launched into individual optical fibre sensor arrays of the kind already described. The reflected signals from each sensor array will pass through the appertaining Bragg cell without deflection during the time that the particular cell is not being driven and will impinge on the photo-detector means individual to that cell.

In another contemplated arrangement the Bragg cells may be driven in sequence with a multiplicty of pairs of pulses of slightly different frequency so that each cell produces a pair of optical pulses of slightly different frequency along respective directions which can then be launched into respective optical fibre sensor arrays.

In a further optical sensing system according to the present invention a multiplicity of pairs of pulses of slightly different frequencies derived from each of the Bragg cells in turn are launched into respective optical fibres each of which is terminated by a plurality of optical sensor arrays in parallel and suitably time-displaced relationship.

By way of example the present invention will now be described with reference to the accompanying drawings in which.

Figure 1:
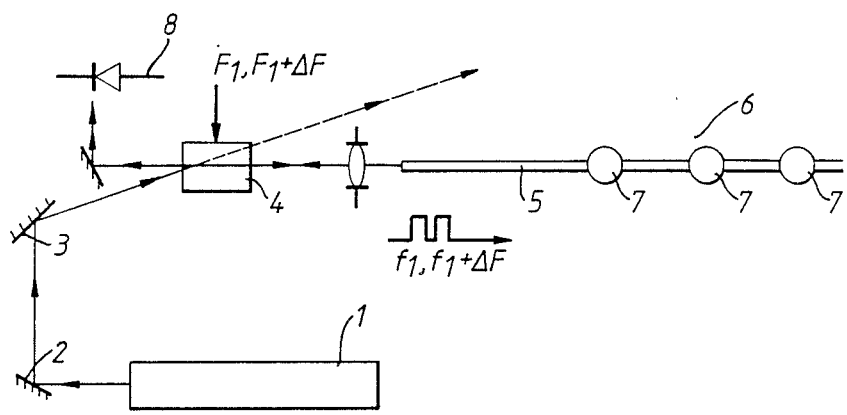
FIG. 1 shows a single sensor array optical fibre sensing system of the kind described in our published European Patent Application No. 0183502.

Referring to FIG. 1 of the drawings, a relatively long coherent length laser light source 1 produces a continuous wave light output which is directed by means of two mirrors 2 and 3 on to a Bragg cell frequency shifting device 4. When the cell 4 is not being driven (i.e. switched off) the continuous wave light input passes through the cell without deflection, as shown. However, when the cell 4 is being driven by a pair of short duration pulses of very close frequencies F1 and F1+ΔF the continuous wave light input to the cell is switched and modulated to produce time-displaced optical pulses of frequencies $f_1$ and $f_1+\Delta F$ ($f_1$ refers to the optical carrier frequency and F refers to the sub-carrier frequency applied to the Bragg cell) which, by virtue of their very close frequencies, are produced with a very small angular deviation between them which enables both output pulses to be launched into one end of the same optical fibre 5 having coupled thereto an optical fibre sensor 6 with a multiplicity of partially-reflective discontinuities 7 equally spaced along the sensor.

In operation of the optical sensor system which may be used in hydrophones for detecting acoustic waves impinging on the sensor array the Bragg cell 4 will be driven at time intervals to produce pulses of frequencies f1 and f1+ΔF which propagate along the optical sensor array 6. A proportion of these pulses is reflected back along the optical sensor 6 and the optical fibre 5 to the Bragg cell 4 from the discontinuities 7 and it will be arranged that the light reflected from the second and later discontinuities 7 will interfere with the light reflected from the preceding discontinuities and this reflected light will be heterodyned by means of a photodetector 8 after passing straight through the cell 4 without being deflected when the cell 4 is in the switched off condition. This photodetector 8 will produce signals at the difference frequency ΔF from which phase modulations due to impingement of acoustic wave signals on the elements of the optical fibre sensor 6 can be detected and measured.

Figure 2:
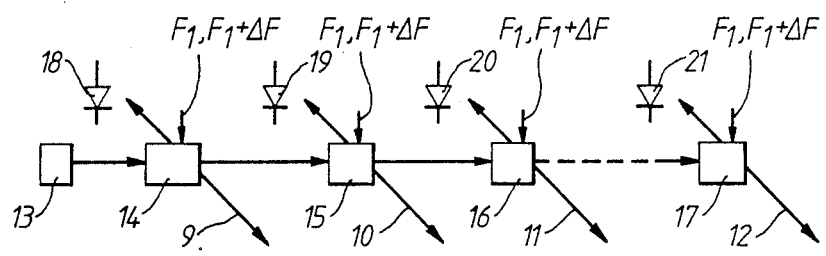
FIG. 2 shows a multi-sensor optical fibre array sensing system according to the invention.
Figure 2:
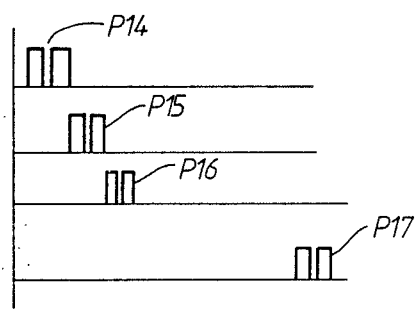

Referring now to FIG. 2 of the drawings, this shows an optical fibre sensing arrangement according to the present invention which provides for the pulsing of four optical fibre sensor arrays 9, 10, 11 and 12 in time sequence from a single continuous wave light laser 13.

Each of the sensor arrays 9, 10, 11 and 12 may be of the same form as the array 6 in FIG. 1 and the sensor arrays are connected to the outputs from respective Bragg cells 14, 15, 16 and 17. These Bragg cells are arranged to operate in the manner described with reference to the cell 4 in FIG. 1 but they are drive in sequence by time-displaced pairs of pulses of frequencies F1 and F1+ΔF. With the Bragg cell 14 being driven, the pair of light pulses produced by the cell, as indicated at P14, will be launched into the sensor array 9 and the reflected light from the array 9 will pass straight through the cell on to photodetector 18 with the cell 14 in its non-driven or switched off condition. The light from the laser 13 will also pass through the cell 14 to the next Bragg cell 15 which is driven next by a pair of pulses of frequencies F1 and F1+ΔF so that it provides a pair of output pulses P15. This procedure is then repeated for the remainder of the Bragg cells 16 and 17 after which the Bragg cell 14 will be re-operated and so on.

Figure 3:
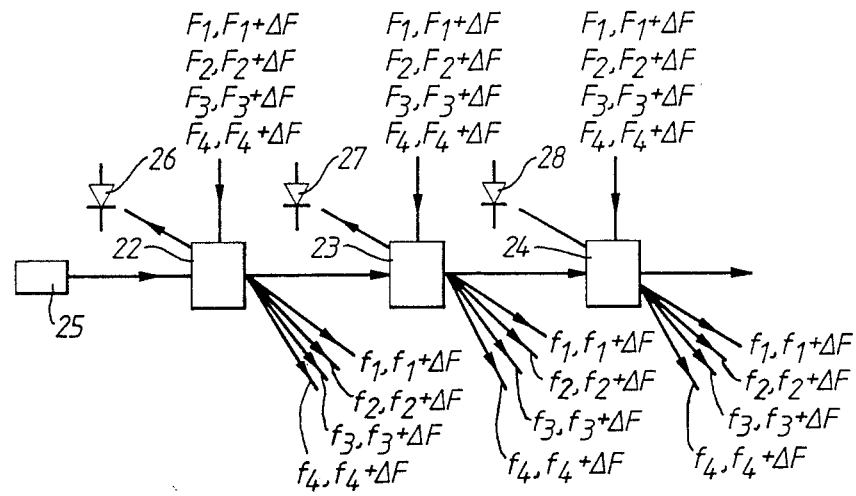
FIG. 3 shows a further multi-sensor array optical sensing system according to the present invention.

FIG. 3 shows another optical sensing system similar to that depicted in FIG. 2 in which each of the Bragg cells 22, 23 and 24 is arranged to receive light from a laser source 25 when the preceding cell is not being driven. The cells are driven in turn by pulse pairs of different frequencies, F1 and F1+ΔF, F2 and F2+ΔF, F3 and F3+ΔF, F4 and F4+ΔF, generated in series or parallel so that output pulse pairs (e.g. $f_1$ and $f_1+\Delta F$) are produced in four different directions from the Bragg cells, as indicated. Each of these pulse pairs of different frequencies will be launched into different optical fibre sensor arrays with the appropriate time delays and the light reflected from the discontinuities along the sensor arrays will be caused to interfere with other reflected signals on respective photodetectors 26, 27 and 28.

Figure 4:
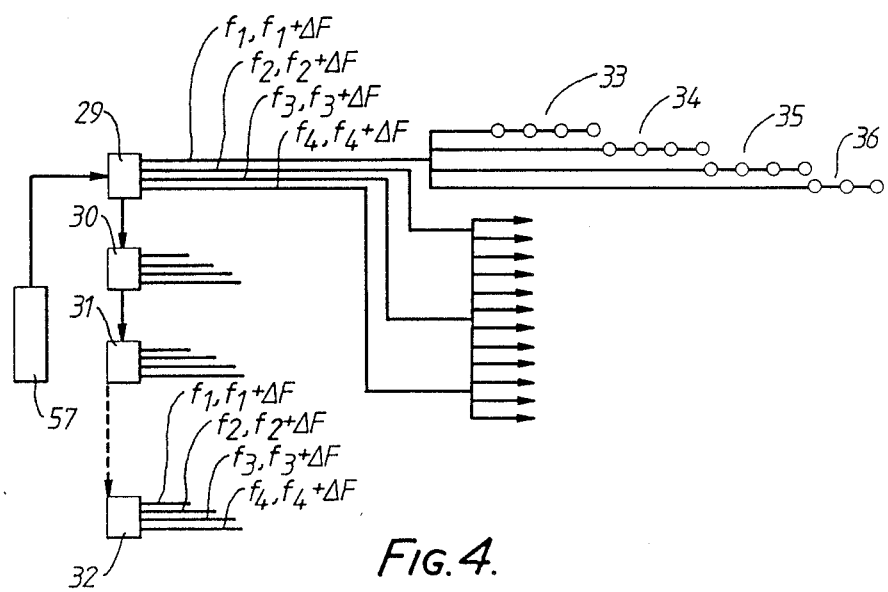
FIG. 4 shows a still further multi-sensor array optical sensing system according to the invention; and, FIG. 5 shows a general switching and frequency shifting arrangement according to the invention producing time multiplexed pulsing of a multiplicity of optical fibre sensor arrays.

In the FIG. 4 arrangement four different frequency output pulse pairs (e.g. $f_1$ and $f_1+\Delta F$) from the Bragg cells 29, 30, 31 and 32 which are driven sequentially are launched into optical fibres each of which is terminated by time-displaced parallel optical sensor arrays such as the arrays 33, 34, 35 and 36 with the appropriate delays. As will be appreciated the number of sensor arrays served by a single laser light-source 57 is increased substantially by this arrangement. The operation of the sensing system is similar to that described with reference to FIG. 3.

Figure 5:
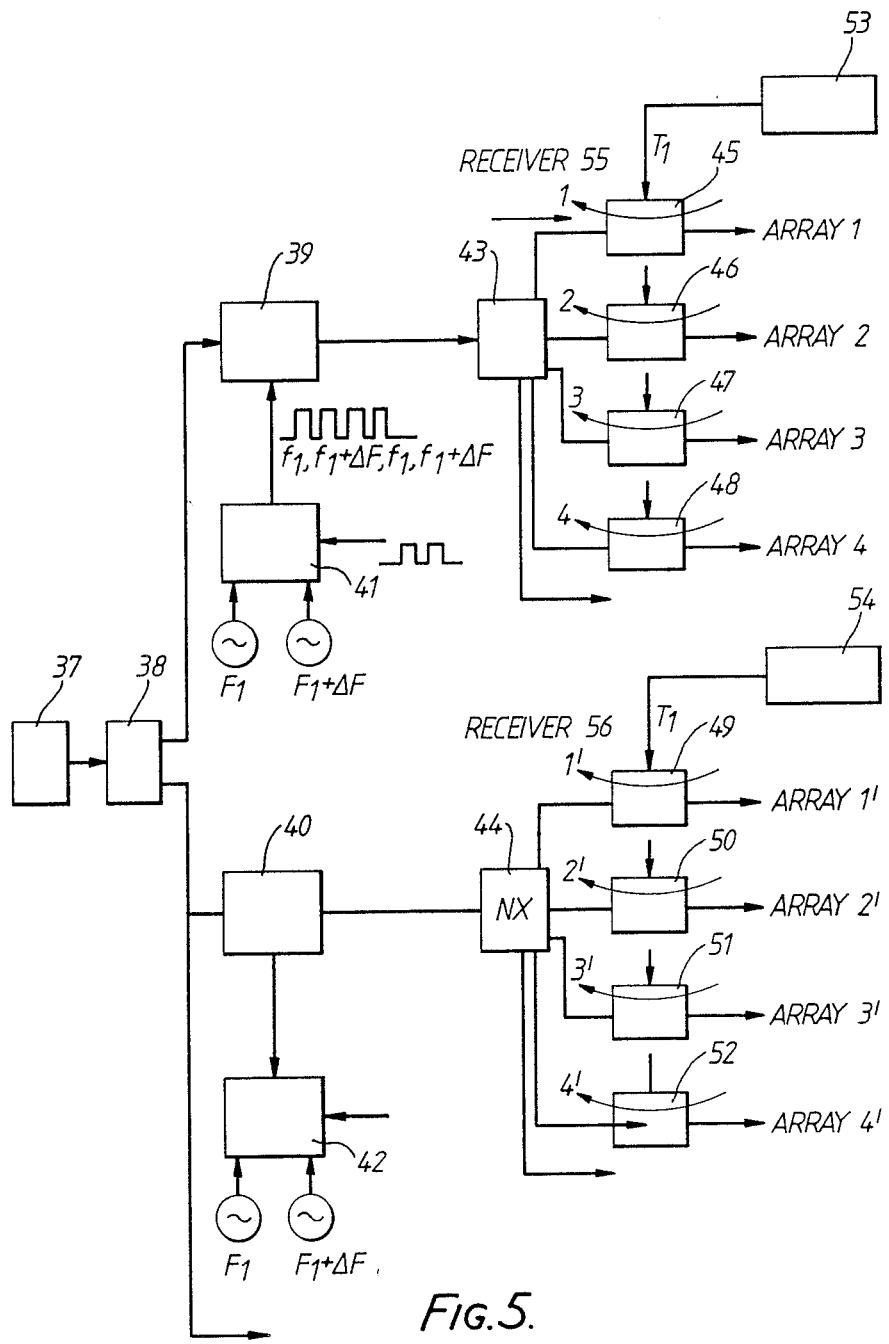

Finally in FIG. 5 the continuous wave light output from a laser 37 is fed to a coupler 38 the output from which is fed to frequency shifters 39 and 40 which are driven continuously by alternate pulses of frequency F1 and F1+ΔF from pulsers 41 and 42. The pulse outputs from the frequency shifters are fed into respective couplers 43 and 44 which couple the alternative pulses of frequency $f_1$ and $f_1+\Delta F$ to switched couplers, 45, 46, 47, 48 and 49, 50, 51 and 52 which are switched under the control of respective timing means 53 and 54.

As each of the switched couplers is switched on by the timing means appertaining thereto pulses of frequencies $f_1$ and $f_1+\Delta F$ are fed to the optical fibre sensor array connected to the output of the coupler concerned and the reflected light (i.e. R1, R2, R3, or R4 or R1', R2', R3', or R4') passes back through the coupler to a photoconductor receiver 55 or 56.

As will readily be appreciated from the foregoing the optical sensing system according the present invention enables relatively large numbers of sensor arrays to be operated from a single laser light source.

We claim:

1. An optical sensing system comprising:
   a single continuous wave light source;
   a series of phase shifting switching devices comprising a first phase shifting switching device proximate said light source, a plurality of intermediate phase shifting switching devices, and a last phase shifting switching device, distant from said light source, said series of phase shifting devices being positioned along a line aligned with said light source to receive light from said light source; and a plurality of driving means each connected to one of the phase shifting switching devices for driving said devices with pulses at different frequencies;

each of said phase shifting devices producing output pulses of different frequencies in different deflected directions and being subsquentially operated by their respective driving means so that the light from the continuous wave light source passes straight through said first phase shifting switching after being driven by its respective driving means device and sequentially through each of said intermediate phase shifting switching devices after each is driven by its respective driving means to the last phase shifting switching until the last phase shifting switching device has produced output pulses whereupon the first device is reoperated for the generation of pulses.

2. An optical sensing system as claimed in claim 1, in which each of the phase shifting switching devices comprises a Bragg cell.

3. An optical sensing system as claimed in claim 2, and further comprising a plurality of first optical fiber sensor arrays, each array being positioned aligned with a Bragg cell and including a plurality of linearly distributed partially-reflective discontinuities, and a plurality of photodetector means each positioned to receive reflected signals from the sensor array of the respective Bragg cell, each Bragg cell producing pairs of output pulses of slightly different frequency at spaced timed interval, said pair of output pulses being launched into the respective optical fibre sensor array, reflected signals from each sensor array passing through the corresponding Bragg cell without deflection during the time that the corresponding Bragg cell is not being driven, to impinge on the corresponding photodetector means associated with each of the Bragg cells.

4. An optical sensing system as claimed in claim 2, in which the Bragg cells are driven in sequence from the first phase shifting switching device to the last phase shifting switching device, each Bragg cell being driven with a a unique pair of pulses of slightly different frequency so that each Bragg cell produces a unique pair of pulses of slightly different frequency along the respective directions into the respective optical fibre sensor array.

5. An optical sensing system as claimed in claim 4, and further comprising a plurality of second optical sensor arrays terminating each of said first optical fiber sensor arrays, said plurality of second optical fiber sensor arrays each including linearly distributed partially-reflective discontinuities and being positioned in parallel and in a time-displaced relationship according to the relative positioning of the partially-reflective discontinuities of each of said plurality of second optical fiber sensor arrays.

6. An optical sensing system comprising a single continuous wave light source, a light coupling device, a plurality of frequency shifting devices arranged to receive light from the light source through said light coupling device, pulsing means for continuously producing a pair of time-spaced pulses of slightly different frequencies to drive the frequency shifting devices each of which generates a pulse output in response to each of the time-spaced pulses, a plurality of optical fiber sensor arrays, a plurality of switching couplers each associated with one of said optical fiber sensor arrays for coupling the output pulses from one of the frequency shifting devices to one optical fiber sensor array, timing means, coupling means for applying pulse outputs from each of the frequency shifting devices to the optical fibre sensor arrays through the respective switching couplers under the control of said timing means.

7. An optical sensing system as claimed in claim 6, and further comprising a plurality of photoconductor receivers for receiving reflected light from each of the optical sensor arrays passed back through the respective switched couplers and associated with a frequency shifting device.

8. An optical sensing system comprising:

a single continuous wave light source;

a series of phase shifting switching devices comprising a first phase shifting switching device proximate said light source, a plurality of intermediate phase shifting switching devices, and a last phase shifting switching device, distant from said light source, said series of phase shifting devices being positioned along a line aligned with said light source to receive light from said light source; and a plurality of driving means each connected to one of the phase shifting switching devices for driving said devices with pulses at different frequencies;

each of said phase shifting devices producing output pulses of different frequencies in different deflected directions and being sequentially operated by their respective driving means so that the light from the continous wave light source passes straight through said first phase shifting switching after being driven by its respective driving means device and sequentially through each of said intermediate phase shifting switching devices after each is driven by its respective driving means to the last phase shifting switching until the last phase shifting switching device has produced output pulses whereupon the first device is reoperated for the generation of pulses;

a plurality of first optical fiber sensor arrays, each array being positioned aligned with a phase shifting device and including a plurality of linearly distributed partially-reflective discontinuities; and a plurality of photodetector means each positioned to receive reflected signals from the sensor array of the respective phase shifting device, each phase shifting device producing pairs of output pulses of slightly different frequency at spaced timed interval, said pair of output pulses being launched into the respective optical fibre sensor array, reflected signals from each sensor array passing through the corresponding phase shifting device without deflection during the time that the corresponding phase shifting device is not being driven, to impinge on the corresponding photodetector means associated with each of the phase shifting devices.

9. An optical sensing system as claimed in claim 8, and further comprising a plurality of second optical sensor arrays terminating each of said first optical fiber sensor arrays, said plurality of second optical fiber sensor arrays each including linearly distributed partially-reflective discontinuities and being positioned in parallel and in a time-displaced relationship according to the relative positioning of the partially-reflective discontinuities of each of said plurality of second optical fiber sensor arrays.

* * * * *